Aug. 22, 1961 J. B. McCORMICK 2,996,762
EMBEDDING STRUCTURE AND METHOD
Filed Dec. 5, 1958 2 Sheets-Sheet 1
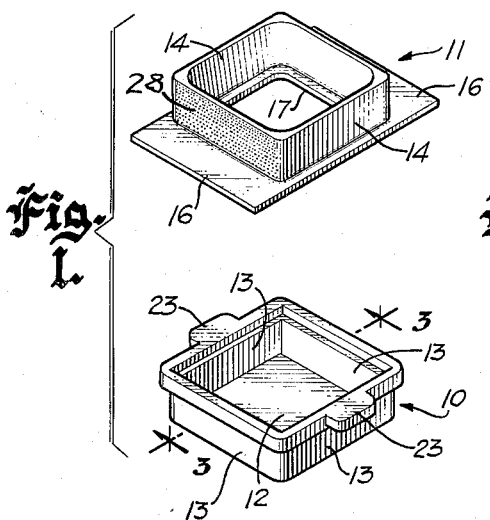
Fig. 1.
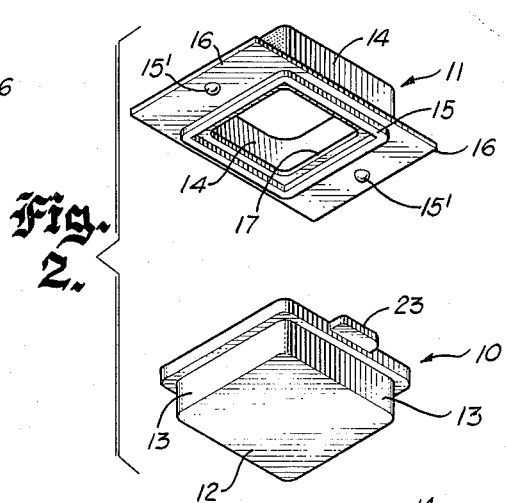
Fig. 2.
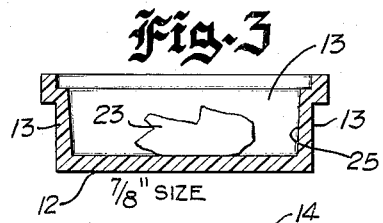
Fig. 3
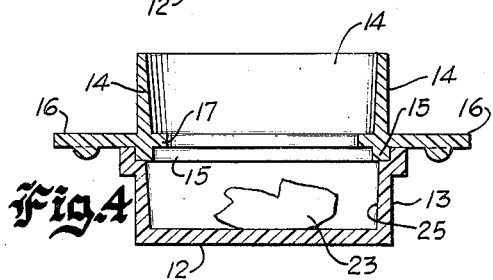
Fig. 4
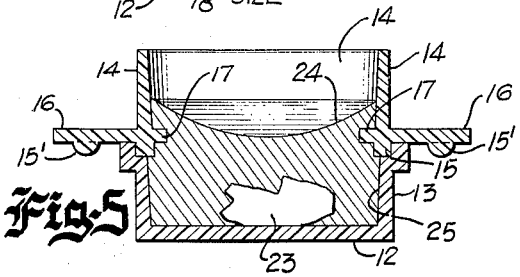
Fig. 5
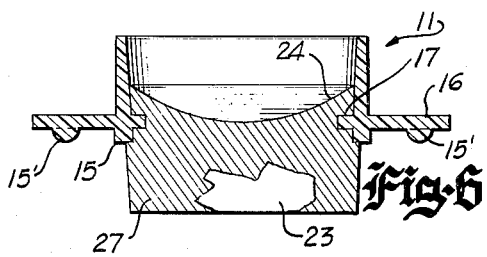
Fig. 6
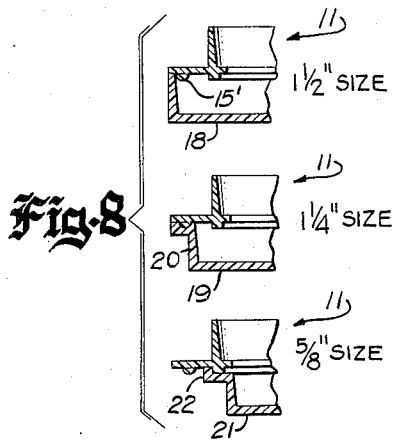
Fig. 8
Fig. 7
Inventor
James B. McCormick
by McCanna & Morsbach
Attorneys.

Aug. 22, 1961    J. B. McCORMICK    2,996,762
EMBEDDING STRUCTURE AND METHOD
Filed Dec. 5, 1958    2 Sheets-Sheet 2
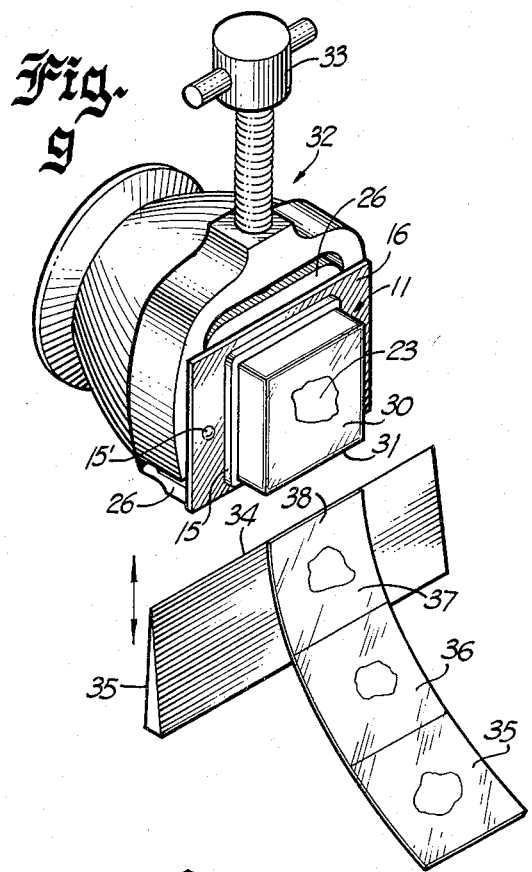
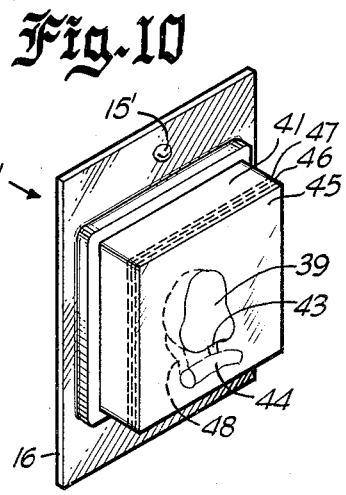
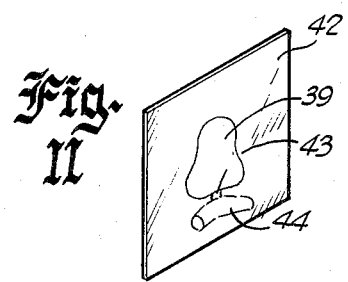
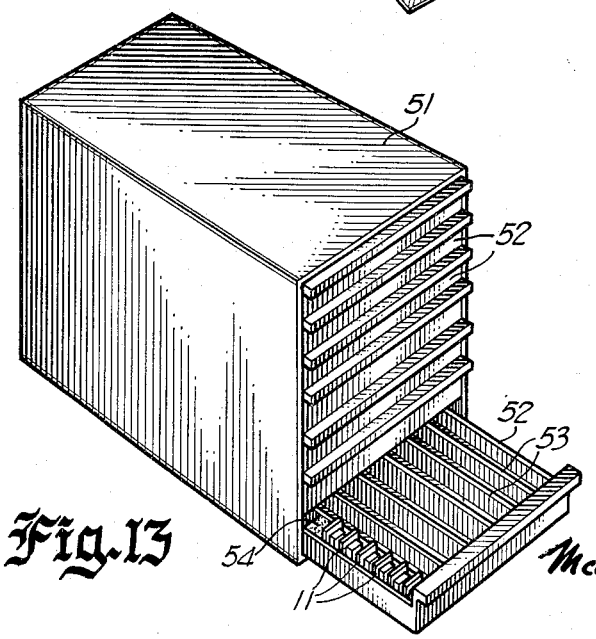
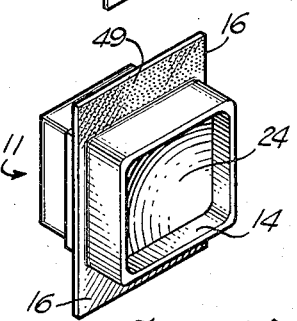
INVENTOR.
James B. McCormick _United States Patent Office_ 2,996,762
Patented Aug. 22, 1961

2,996,762
EMBEDDING STRUCTURE AND METHOD
James B. McCormick, 521 S. Madison Ave.,
La Grange, Ill.
Filed Dec. 5, 1958, Ser. No. 779,043
5 Claims. (Cl. 18—26)

This invention relates to the embedding of specimens, tissues, cell structures and the like for use in studies including such subjects as histology, parasitology, bacteriology, botany, zoology and kindred subjects. More particularly, the invention relates to the art or technique of embedding the speciments or tissues in preparation for microscopic study as, for example, embedding the specimens in paraffin wax by a molding process so that when the embedded specimen hardens it may be sliced by means of a cutting instrument such as a microtome in a well known manner preparatory to placing the specimen on a slide for microscopic study.

My invention is primarily intended for medical work in hospital laboratories. Here the purpose of the study is to establish a diagnosis of tissue which has been submitted by the patient's doctor. The embedding and preparation of the tissue is done by a laboratory technician under the direction of a physician pathologist. The dispatch with which the tissue is processed and the accuracy of the resultant tissues are of considerable importance. Where serial study is required as distinguished from single tissue or scanning study there is likelihood of error in the diagnosis in the event the specimens do not present the true conditions. Such conditions were apt to occur with the prior practice. Also of importance is the time factor. The saving of minutes in making the diagnosis may be ahead of a radical change in the patient's condition. This could make possible the proper treatment at a point where the illness of the patient might have turned one way or the other. My invention aims to shorten this gap in preparation of these tissues. Also important is the cost factor. Here we have as a practical matter the budget limitations normally applied to this particular type of activity. We are dealing not with laboratory research or pure science, but with the economy limitations in hospitals and in medical practice. My invention provides a new technique effecting a substantial saving of time and cost of these operations and promoting greater accuracy in diagnosis.

The processing of these specimens or tissues involves such steps as the selection of a proper tissue, dehydration of this tissue with one of several dehydrants, clearing of this tissue with a soluble oil or other acceptable clearing agent, infiltration of this tissue with a paraffin wax or a combination of wax and resinous material, embedding of this impregnated tissue in a block of paraffin wax and allowing it to harden, and mounting this paraffin block with its embedded tissue into the chuck of a cutting instrument commonly known as a microtome for the purpose of slicing thin sheets from the block whereby the paraffin surrounding the impregnated tissue serves to support the slice of tissue so that it may be used on a slide for microscopic study. For many years it has been common practice to mold these specimens by any of a variety of makeshift methods, some of which are relatively crude. Such prior methods include the provision of any box made of glass, wood or paper providing a confined area in which to pour the molten paraffin wax and into which the tissue has been placed for embedding. A more refined and long standing practice has been to place a specimen on a metal base plate and then place on the plate two L-shaped side walls of lead to form a mold around the specimen. The fluid paraffin is poured into the open top of this mold and the heavy side walls are removed after the paraffin hardens. The paraffin block with the embedded specimen is then removed and affixed to the serrated face of a block or disc of metal or hard fibre which is then clamped in the jaws of a microtome and serves to hold the paraffin block in position for the slicing operation. In another method the metal mold has side walls hingedly connected together so that the side walls may be swung to an open position to facilitate removal of the molded block. While such embedding molds are now in quite general use, they are not altogether satisfactory because: (1) The cooling capacity of the metal mold causes an imperfect exterior surface on the paraffin block; (2) the paraffin has a tendency to stick to the metal walls; (3) the metal boxes must be cleaned and this involves time and attention on the part of the operator; (4) to support the paraffin block in the head of a microtome for slicing it must be affixed to a so-called embedding block or disc which is directly clamped in the microtome, and the operations of fastening the paraffin block to the embedding block requires time and skill of an operator; (5) if the previous step is omitted the paraffin block must be carefully and accurately trued on opposite sides to properly fit in the head of the microtome, otherwise the fragile paraffin block may be fractured or damaged when it is clamped for the slicing operation; (6) it is necessary to provide a paper tag or the like with which to identify the specimen by name or number and this tag must be affixed to the paraffin block by means of a hot knife or some other implement; (7) if such identification tags are not affixed with due care and attention they are liable to come off or be displaced or lost with the result that the identification is gone; (8) a relatively large amount of paraffin wax is used, which is uneconomical; (9) the many manual operations as well as the skill and attention of the attendants necessitate a relatively large amount of time and cost; and (10) the storage of these large paraffin blocks for reference purpose makes further cost because of the aggregate bulk.

In the present invention I have aimed to provide a new and improved technique in the embedding of specimens and tissues of the character described.

I have also aimed to provide a new and improved embedding box as well as a new and improved method of embedding, which will serve to be accurate, economical, and easy to use. Another feature is that the resultant embedded specimen is a unitary structure including an exterior body or box portion of accurate shape designed for quick and easy clamping in the head of a microtome. This exterior body portion is itself a molded part and the specimen tissue is embedded in the paraffin wax in a single operation which also embeds and retains the specimen in the box part.

In furtherance of these general objects, I have provided a two-part box structure in which the embedding operation takes place. These box parts are preferably molded of special materials providing firm and accurate form-sustaining walls. Thus the box part with the embedded specimen forms a unitary structure, has true and durable walls for engagement in the jaws of the microtome, thereby eliminating the need for cleaning or truing the paraffin surfaces preparatory to clamping in the microtome, and insuring firm and accurate holding of the embedded specimen so that the cutting will be accurate and uniform. This phase of my invention is accomplished by providing a two-part molding box of novel design and construction, a lower part of the box serving to hold the specimen and an upper part serving as a pouring frame or fence which seats on the top of the first mentioned box and through which the molten paraffin is poured for embedding the specimen. The frame part is provided with interior projections or configurations which because of their shape become embedded in the paraffin and serve to retain the paraffin body in connection with the upper frame. Upon removal of the lower box part the paraffin with its embedded specimen constitutes a unit with the upper frame, which unit is clamped in the microtome for slicing as above mentioned. The upper frame part is directly clamped between the jaws of the microtome with the embedded specimen projecting from the frame and securely held in position for slicing.

Another object is to provide a two part embedding box of the character described in which one of the box parts becomes a permanent part of the molded object which contains the specimen and serves as a permanent retainer for storing and identifying the specimen. This is in contrast with prior methods above mentioned which employ heavy lead embedding boxes.

Another object is to provide a new and improved embedding box of the character described, so designed that the upper frame part may be used with any of a plurality of lower box parts of different sizes to accommodate specimens of different sizes.

Another object is to provide an embedding box of the character described wherein the upper frame part which becomes a unit with the embedded specimen, is provided with a special surface on which to inscribe the identification data for the particular specimen.

Other objects and attendant advantages will be appreciated as the invention becomes better understood by reference to the following description when considered in connection with the accompanying drawings, in which:

FIGURE 1 is a perspective view of the upper and lower parts of an embedding box structure with the parts separated, as viewed from above, embodying my invention;

FIG. 2 is a perspective view of the same parts as viewed from below;

FIG. 3 is a cross-section through the lower box part on the section line 3—3 of FIGURE 1 showing a specimen positioned within the lower box part;

FIG. 4 is a similar section but showing the upper box part positioned on top of the lower box part for pouring the paraffin;

FIG. 5 is a similar section showing the paraffin after it has been poured through the open top of the assembled box parts;

FIG. 6 is a section through the unit comprising the embedded specimen and the upper box part after the lower box part has been removed;

FIG. 7 shows the finished unit clamped between opposed jaws of a microtome with the projecting embedded specimen in position to be sliced by successive slicing operations to obtain individual specimen slices suitable for use with diagnosing equipment;

FIG. 8 shows the manner in which the upper box part may be used with any of a plurality of lower box parts of different sizes or capacities;

FIG. 9 is a perspective view, somewhat diagrammatic, showing the finished unit clamped in the microtome, the slicing knife, and a series of specimen slices cut in succession;

FIG. 10 is a perspective view of a finished unit showing an embedded tumor specimen in connection with the study of specimens successively cut from the paraffin block;

FIG. 11 is a perspective view of a first specimen cut from the block shown in FIG. 10;

FIG. 12 is a perspective view of an upper box part showing the case identification surface on one of the wing portions instead of on one face of the upper box wall as shown in FIG. 1; and FIG. 13 is a perspective view of a case having drawers in which the finished units are stored for safekeeping and for ready access.

As illustrative of my invention the two part embedding box consists of a lower box part designated generally by 10 and upper box part designated generally by 11. The lower box part is essentially a mold and the upper box part is a ring-shaped mold member but having additional functions, as described below. The lower box part has a bottom wall 12 and side walls 13, making an open top structure of rectangular or any suitable configuration. The inner face of each side wall 13 is slightly tapered to provide draft for easy removal from the embedded paraffin body as will be presently apparent. The upper box part has side walls 14 which provide an opening for pouring the paraffin into the lower box part. The upper box is shaped to seat on the lower box part and is provided with suitable positioning lugs 15 which fit inside the bottom box part at four sides thereof and locate the upper box part in proper relation to the lower part. The upper part has laterally extending flanges 16 which are of suitable length to cover lower box parts of different sizes, as will presently be described. The upper box part is also provided with an interior configuration adapted to be embedded in the paraffin for fixedly retaining the molded paraffin in the upper part. In this instance this purpose is served by internal ribs 17. The upper and lower box parts are molded or injectioned molding material which has specifications suitable for their particular use. The upper box part may be molded of high impact styrene. My invention contemplates the use of material for the lower box part having a greater coefficient of heat transmission than that of the upper box part and also of the paraffin. Preferably I make the lower box part of metal such as aluminum, but other metals of relatively high coefficient of heat transmission may be used. With this combination the heat exchange from the aluminum mold is more rapid than from the upper box part, thereby causing the paraffin within the aluminum mold to cool at a more rapid rate than the paraffin confined within the upper box part. The net effect of the cooling of the paraffin in this assembly is that the shrinkage pattern extends downward into the aluminum mold and produces a full impression of the paraffin against the bottom and side walls of the mold. This produces an impression with the specimen in a flat or plain surface at the face of the molded paraffin body and insures a flat initial sectioning of the tissue to be studied. Also it produces full parallel side walls and definite rectilinear edges on the molded paraffin body, the purpose of which is described below with relation to the finished unit and the support of such unit in the microtome for slicing.

In the use of my invention in hopsital laboratories as above described, I have aimed to effect certain economies by providing lower box parts of different sizes to accommodate the optimum range of specimens and to provide only a single size upper box part which will coact with any of the different sizes of lower box parts. The specific sizes herein disclosed are for purpose of illustration, although in actual practice I have found them to be satisfactory in the described hospital laboratory practice. The lower box part 10 shown in FIGS. 1 to 5 inclusive is the ⅞" size. This has a square mold measured ⅞" between the inner faces of opposed side walls 13. FIGS. 1 and 2 show the box parts approximately full size. FIGS. 3, 4 and 5 show the ⅞" size box parts enlarged. FIG. 8 shows fragmentary views of the ⅝", 1¼" and 1½" sizes of lower box parts, each coacting with the single upper box part 11. The largest size lower box 18 has a length and width corresponding with the length and width of the upper box 11 so that the latter seats on the top of the side walls of such lower box part. A small nipple projection 15' provided on the underside of each extension 16 serves to engage inside the side wall at each end of the largest lower box part 18, locating this box part against endwise displacement. Sidewise displacement is prevented by the depending flange 15 on the upper box part which fits inside the side walls of such largest lower box part. The 1¼" size is measured between the inner sides of the end walls 20 and each such end wall is provided with a locating recess to receive the adjacent nipple projection 15'. The smallest size lower box part 21 has a mold cavity ⅝" square. In this size the side walls of the lower box part are extended laterally at the top and terminate in an upturned marginal flange 22. The marginal flange 22 fits outside the positioning lugs 15 which as shown in FIG. 2 extend continuously around the square opening in the upper box part. Thus the fit between the flanges 22 and 15 locates the box parts in registration and against displacement laterally. It will be observed that the end flanges 16 on the upper box part are of sufficient length to cover the open top of the larger lower box parts for the 1¼" and the 1½" sizes. Each lower box part has laterally extending tabs 23 located centrally between the ends and flush with the top surface of such part as shown in FIG. 1. These tabs project beyond the sides of the upper box parts when the box parts are assembled. After the paraffin has hardened with the specimen embedded therein, as described below, the lower box part or mold will be separated from the molded paraffin body by thumb engagement with the tabs or by inserting a thin blade instrument between one of these tabs and the bottom edge of the upper box part. Each upper box part becomes an integral part of the finished unit which includes a paraffin embedded specimen. The lower box part which serves as the base mold for casting the specimen is intended to be repeatedly used with any of the upper box parts. These embedding box parts are preferably formed by molding but they may be made by other methods.

My new method of embedding specimens is as follows: The lower box part 10 is placed open side up on a suitable support and the specimen indicated by 23 is placed within this box part resting on its bottom 12. I have made particular note of the necessity of positioning or orienting these specimens on the bottom surface 12 to a selected point of tissue or plane of tissue which is the area we are interested in examining. Further, I have aimed to have the resultant base or face of the embedded tissue perfectly flat so that the initial section will be flat and uniform. Also I have aimed to produce a finished paraffin block having perfectly parallel sides as distinguished from irregularities and distortions which are apt to occur with the prior practice and require shaving and trimming operations. This uniformity and fullness of casting provides a permanent reference plane or edge with relation to the supporting and locating surfaces of the finished unit, the purpose of which is described below. Having thus positioned the specimen, the top box part 11 is then placed on the lower box part in the manner shown in FIG. 4. Melted paraffin is then poured into the box structure through the open top of the upper box part and the paraffin is allowed to come above the internal projections 17 of the upper box part, completely embedding the specimen and such retaining parts. The paraffin is then allowed to cool. Cooling may be hastened by placing the unit in a shallow pan of ice water, or by other suitable means. It will now be observed that by reason of the above described difference in the coefficient of heat transmission between the upper and lower box parts, together with the physical properties of the paraffin, an important function is produced. Paraffin or wax such as is used most frequently in this practice, when in a molten state at approximately 50 to 60 degrees centigrade has an increase of volume of approximately 10% over its solid state. When the paraffin cools the shrinkage of the paraffin moves in the direction of the greatest heat exchange; consequently in casting into the lower box which has the greater coefficient of heat transmission the shrinkage moves toward sides and bottom walls of the box or mold, thereby insuring full and firm impression of the paraffin against these walls and providing the desired flat surface 30 and reference edge 31 noted in FIG. 9. Resulting from this shrinkage is the meniscus 24 shown in FIGS. 5 and 6. It is noted that the paraffin need not completely fill the upper box part. It is sufficient merely to fill to a level above the internal projections 17 to insure the desired undercut interlocking between the upper box part and the paraffin when the latter hardens. Thus a considerable saving in paraffin is obtained.

The lower box part may now be removed from the molded paraffin body as described above. This leaves the finished unit consisting of the integrally-connected upper box part and the molded paraffin body. This unit may now be placed between the jaws 26 of a microtome in the manner shown in FIGS. 7 and 9. It is noted that this unit has been inserted between the microtome jaws until the flange 16 contacts the outer ends of the jaws and that the jaws clamp against the outer faces of the flat walls 14 of such unit. Thus the unit is located and held in a predetermined position for the purpose of holding the face 30 of the paraffin mold and its edge 31 (FIG. 9) exactly parallel with the plane in which the cutting blade moves, as described more fully below. It is noted that the microtome jaws engage only against the rigid and definitely shaped outer faces of the upper box part and that this contact engagement is not with the paraffin itself or with a supplemental part such as a wooden block to which the paraffin block has been attached after the embedding operation, as has been the common practice heretofore. Instead, the jaws 26 engage the firm and accurately formed walls of the upper box unit and thereby this unit is accurately and firmly clamped in position for the shaving or slicing operations. Slicing of the embedded specimen is from the projecting paraffin body 27; and such slicing may be repeated for plural specimen tissues. For case identification of each specimen I utilize the upper box part by forming one face thereof with a writing surface as at 28. This is formed in the molding operation, the frosted surface being produced by etching the mold.

Attention is further directed to the manner in which the embedded specimen is positioned and held in the microtome for slicing. FIG. 9 is a more complete showing of a conventional microtome head 32 and its hand screw 33 for moving one of the jaws 26 in clamping and releasing movements. It will be observed that the flange 16 of the finished unit is seated directly against the outer face of the microtome head so that when the jaws 26 clamp the walls 14 the paraffin mold is definitely and accurately positioned. Thus, each time a finished unit is mounted in the microtome its face 30 will be supported in a predetermined plane with relation to the face of the microtome. Likewise the edge 31 of the paraffin mold will be accurately supported in predetermined relation to such face of the microtome and also to the cutting edge 34 of the reciprocating knife 35. The edge 31 is supported in exact parallelism with the cutting edge 34 of the knife and the latter moves in a plane exactly parallel with the face 30 of the paraffin body. Under this condition the slice from the paraffin body will be of uniform thickness throughout. Also successive slices 35, 36 and 37 will be of ribbon form because of the fact that the trailing edge 38 of each slice is retained on the edge of the knife and upon the next succeeding stroke of the knife this edge 38 will register with the edge 31 of the paraffin body throughout the length of these edges and will be joined one to the other by pressure of the advancing slice. This not only facilitates the handling of the specimen slices but it is most important in the serial study of specimens.

Attention is further directed to the accuracy with which any embedded specimen may be repositioned in the microtome for obtaining specimens having precise relationship to previously sliced specimens. This is extremely important as a factor in avoiding error in diagnosis. For example, one of the characteristics of malignant tumor tissue is its ability to invade by infiltration the adjacent normal tissue. In studying tumor it is frequently this criterion of tissue invasion that separates a benign process from a malignant process. An illustration of this phenomenon would be in malignant tumors of the thyroid gland where the tumor tissue might appear benign in its cellular detail but the evidence of invasion of a vascular structure would be interpreted as indicating a malignant change. In studying such a condition in an area wherein tumor cells lie adjacent to a blood vessel the suspicion of infiltration of tumor cells would be aroused. This suspicion would be followed by a request for repeat specimens from the same area to determine whether forward growth of the tumor went through the vessel wall and invaded a normal tissue. It is here extremely important to be able to recut the original specimen in precisely the same plane of sectioning so as to reveal the true progress of the particular area. Such a condition is shown somewhat diagrammatically in FIGS. 10 and 11. FIG. 10 shows such a tumor specimen designated generally by 39 embedded in the paraffin body 41. FIG. 11 shows a first specimen slice 42 removed in the manner described. Examination of this specimen through the microscope reveals at point 43 an area of suspicion where the tumor tissue 39 appears to be growing close to the blood vessel 44. This suspicion prompts the pathologist to study additional sections of the tumor tissue through precisely the same reference plane. Inasmuch as the specimen body would likely have been removed from the microtome for storage or to give way to the taking of slices from other specimens, it is necessary to remount the unit having the paraffin body 41 and to make additional cuttings such as 45, 46 and 47, as the case may be. By reason of the accurate positioning of the paraffin body with the face precisely in the same predetermined plane with respect to the cutting blade as described above, each specimen will be cut with precision in exactly the same reference plane. Thus a study of the successive sections will reveal the tumor tissue infiltrating this blood vessel as in the area 48 of successive specimen slices 45, 46 and 47. This procedure which is predicated essentially on remounting the paraffin body precisely with relation to a predetermined reference plane definitely avoids the chances of error in interpretation inherent in previous methods.

Such previous methods have also involved intrinsic error due to failure of preserving identification of the embedded specimen. Usually a small piece of paper or cardboard containing the identification marking is attached to the paraffin block in which the specimen is embedded, using a hot spatula for melting the paraffin at the point of attachment to the block. Not infrequently these paper identifications come loose and the block no longer is properly identified. This is particularly true where the paraffin blocks are stored somewhat promiscuously in boxes usually of odd sizes collected around the laboratory. My invention avoids this condition by utilizing the upper box part as a permanent means of identification. Preferably an exterior surface of this box part is etched to provide a surface suitable for marking the desired identification date with a graphite pencil. In FIG. 1 such a surface is indicated at 28. In FIG. 12 the face 49 of one or both of the flanges or wings 16 is etched or suitably treated for marking. This identification is further preserved by storing the finished units in shallow drawers having partitions for holding the units in rows with the identification end uppermost and facing to the front. Inasmuch as all the finished units are of the same overall length and width irrespective of the four sizes of lower box parts or molds herein disclosed, they may be uniformly stacked one against another in horizontal rows with the markings facing forward. In FIG. 13 I have shown a practical and economical case 51 for holding a number of such drawers 52 each provided with partitions 53 spaced apart just sufficiently to hold the finished units, as described. The units are held one against another in upright position by suitable means at the back of each row, such as by a block of spongelike material 54. Thus a permanent system of caring for embedded tissues is provided. Also, the case 51 which provides for a filing system is used as a shipping case for the box parts.

It will be apparent from the foregoing that this new technique in embedding specimens effects a saving in the amount of paraffin used and in the time required by the technician as compared with previous methods. This is particularly so with respect to the most commonly used prior practice of molding a paraffin block of substantial mass and either trimming the sides for better mounting in the microtome or heat-sealing the paraffin block to the face of a fiber or wooden block which is to be clamped in the microtome. In the latter method it is customary to remove the paraffin block from the wooden block after slicing the specimen so that the wooden block may be repeatedly used. The removed paraffin blocks are then placed in storage as above pointed out. It will be apparent that my invention eliminates a great deal of hand labor and time required by previous methods, primarily because of the simple manner in which the specimen is embedded in a permanent box part or mold which also serves to accurately position and hold the specimen in a microtome for slicing. Also, the particular manner in which the specimen unit is positioned in the microtome, regardless of repeated mountings, serves to avoid errors in diagnosis which undoubtedly have occurred or are apt to occur because of inaccuracies of the planes of repeat sections resulting from prior practices.

While I have illustrated a single physical embodiment of my invention it will be obvious to those skilled in this art that changes may be made in details of construction and in the technique of preparing specimens ready for microscopic study. In the claims "base mold" is used to designate generally a mold of the kind described above as the lower box part 10, and "open mold" to designate generally a mold of the kind described as the upper box part 11. The term "paraffin" is used in the description and claims as defining any material suitable for embedding specimens within the contemplation of my invention. Likewise, the term "specimen" is used as denoting any tissue, cell structure, or other object to be embedded for study. Also, while I have designated certain materials for the molded box parts which I have found to be suitable and advantageous for the purposes of my invention, it should be understood these may be changed or others substituted. It is contemplated that these and other modifications may be made which are within the true spirit and scope of the invention as defined in the appended claims.

I claim:

1. Means for embedding a specimen in a paraffin body as part of a finished unit preparatory to mounting the unit in the specimen holder of a microtome for slicing from the paraffin body a thin sheet containing a section of the embedded specimen for microscopic examination of said specimen section, comprising a base mold having a substantially flat bottom wall, side walls and an open top, the bottom wall of the mold serving to support a specimen and the bottom and side walls serving to define the shape of the finished paraffin body when hardened after the heated paraffin has been poured into the mold through the open top thereof for embedding the specimen with the specimen oriented on the face of said bottom wall, and an open mold shaped to seat on top of said base mold, the open mold having a permanent wall structure with an interior configuration shaped for retaining the paraffin body therein when the paraffin hardens and an exterior configuration providing mounting surfaces in a plane parallel with the plane of the said flat bottom wall, the base mold being removable from the molded paraffin body, the open mold and the molded paraffin body constituting a finished unit adapted to be mounted in the specimen holder with said mounting surfaces seated against said holder whereby to position the specimen embedded face of the paraffin body in a plane parallel with that of said mounting surfaces and parallel with the path of travel of the microtome cutting knife.

2. Means as set forth in claim 1, in which the base mold is of a material having a coefficient of heat transmission greater than that of the open mold whereby the shrinkage of the paraffin when cooling moves toward the bottom and side walls of the base mold to promote greater impression of the paraffin body against said walls and positioning of the specimen in close relationship to the face of the bottom wall.

3. Means as set forth in claim 1, in which the base mold is of a given small size and the open mold has flange-like extensions shaped to cover the open top of base molds of larger sizes than said small size base mold, whereby the open mold may be used with any of a plurality of base molds of sizes larger than said given small size.

4. A method of embedding a specimen in a body of paraffin as part of a finished unit and mounting the unit to the specimen holder of a microtome to enable cutting from the mounted paraffin body a thin sheet containing a section of the embedded specimen for microscopic examination thereof, which comprises positioning a specimen through the open top of a base mold to an oriented location with the specimen supported on the substantially flat bottom surface of the mold, in which position the specimen may be embedded in molten paraffin poured into the mold through its open top, placing on top of the bottom mold an open mold through the open top of which molten paraffin may be poured into the assembled molds, the open mold having an interior configuration shaped for retaining the paraffin body therein when the paraffin hardens and having an exterior configuration providing mounting surfaces in a plane parallel with the plane of said flat bottom surface, causing molten paraffin to be poured into said molds to a level in the open mold sufficient to cover said interior configuration thereof, causing the paraffin to harden in said molds with the face of the specimen in the plane of the paraffin body formed by said flat bottom surface of the base mold, removing the base mold from the paraffin body thereby leaving a finished unit comprising the open mold having the paraffin body extending therefrom with said plane face at its end remote from the open mold, and mounting the unit to the specimen holder of a microtome with said exterior mounting surfaces of the open mold seated and clamped against complementary faces of said specimen holder to accurately position said plane face parallel with the plane of travel of the microtome cutter.

5. A method as set forth in claim 4, in which the base mold is of a material having a coefficient of heat transmission greater than that of the open mold, whereby the difference in the described coefficients of heat transmission of the base mold and the open mold will effect more rapid heat exchange between the paraffin and the base mold in a downward shrinkage pattern producing full impression of the paraffin against the walls of the base mold and positioning of the specimen in close relationship to the face of the base mold.

References Cited in the file of this patent

UNITED STATES PATENTS

| | | |
|---|---|---|
| 1,799,524 | Morgan | Apr. 7, 1931 |
| 2,482,853 | Ladd | Sept. 27, 1949 |
| 2,776,596 | Eigen | Jan. 8, 1957 |
| 2,830,325 | Bray | Apr. 15, 1958 |
| 2,868,072 | Weiskopf et al. | Jan. 13, 1959 |
| 2,879,548 | Croce et al. | Mar. 31, 1959 |

FOREIGN PATENTS

| | | |
|---|---|---|
| 505,752 | Belgium | Mar. 11, 1952 |